United States Patent Office 3,037,960
Patented June 5, 1962

3,037,960
LINEAR SEGMENTED COPOLYESTER AND ARTICLES FORMED THEREFROM
August H. Frazer, Wilmington, Del., assignor to E. I. du Pont de Nemours and Company, Wilmington, Del., a corporation of Delaware
No Drawing. Filed Jan. 9, 1958, Ser. No. 707,852
15 Claims. (Cl. 260—45.4)

This invention relates to linear, segmented copolymers containing sequences of repeating units of two different polyesters, each polyester being composed of a different repeating unit. It further relates to the critical selection of polyesters, aromatic diols, and acid chlorides to provide segmented copolyesters which may be shaped into films or filaments of high elasticity.

There is a particular need in the textile field for elastic filaments to replace rubber. Most rubber fibers that are used in textile applications are tiny strips of film that have been cut from a sheet of rubber. This sheet, before slitting, has to be milled with stabilizers and curing agents and cured at elevated temperatures for several minutes. The fibers or film strips produced by this route have many disadvantages. First, really fine denier fibers cannot be produced because of the limits imposed by the cutting process; furthermore, rubber is so weak and has such poor abrasion resistance that fine denier yarns cannot be practicably produced. The process for producing the rubber yarns is expensive and their durability in ultraviolet light is poor. It is therefore desirable to find an elastomer which has improved toughness suitable for making fine denier yarns and consequently lighter weight fabrics. Improved toughness in yarns will also give improved service (less failure by breaking) in fabrics. It is desirable to find an elastomer which can be spun into yarn by relatively cheap melt- or dry-spinning processes. Furthermore, an elastic fiber with greater ultraviolet durability than rubber would be desirable.

Linear segmented copolyesters have been known heretofore. For example, Flory U.S. 2,691,006 teaches the preparation of segmented copolyesters by chemical combination of two different preformed polyesters. However, there has been no recognition of the critical selection of starting materials necessary to make a segmented copolyester from which suitable elastic films and fibers may be prepared.

An object of this invention, therefore, is to provide linear segmented copolyesters which are suitable for shaping into elastic films and fibers. Another object is to provide elastic films and fibers composed of such segmented polymers which have the required elastic properties by virtue of critically selected reagents. A further object is to provide elastic segmented polymers having an outstanding degree of oxidative stability as well as stability to ultraviolet light. These and other objects will appear in the following description of the invention.

The objects of this invention are accomplished by a segmented, substantially linear copolyester consisting of alternating first and second polyester segments connected through ester linkages, said first segment being the residue on removal of the terminal OH groups from a hydroxyl-terminated polyester having a melting point below about 50° C. and a molecular weight above about 600, said second segment being at least one repeating unit of a polyester having a melting point above about 200° C. in its fiber-forming molecular weight range, that is, about 10,000 or above, said second segment containing the group —O—R—O— in the polymer chain, wherein R is the residue on removal of OH groups from an aromatic diol.

This invention provides polymers containing (1) a hydroxyl-terminated polyester with a molecular weight above about 600 (preferably between about 800 and 5000) and a melting point below about 50° C. chemically united through ester linkages to (2) units or segments of a polyester which in the non-segmented state has a melting point above 200° C. in the fiber-forming molecular weight range. The segmented copolyesters of this invention are prepared by reacting a selected hydroxyl-terminated polyester and an aromatic diol with the acid chloride of an aliphatic, cycloaliphatic, or aromatic dibasic acid.

For utility in fiber and filament applications, it is desirable to have elastic products which require no after-curing or after-treatment. In order to be suitable in textile applications for the replacement of rubber yarns, a synthetic elastic fiber should have as a minimum requirement a tensile recovery of 90% or more and a stress decay of less than 20%. "Tensile recovery" is the percentage return to the original length within one minute after the tension has been released from a fiber sample which has been elongated 50% at the rate of 100% per minute, and held at 50% elongation for one minute. "Stress decay" is the percent loss in stress in a yarn one minute after it has been elongated to 50% at the rate of 100% per minute.

Elastic fibers having the above-described minimum requirements are provided by the segmented polymers of this invention. These copolyesters are composed of "soft segments" and "hard segments" alternating in the polymer chain. The "soft segment" is a polyester having a molecular weight between about 600 and 5000 and melting below about 50° C. As indicated above, such a polymer may be reacted with an aromatic diol and a diacid chloride. In the resulting polymer chain, the polyester segment formed from the aromatic diol and the aliphatic, cycloaliphatic, or aromatic diacid chloride then constitutes the "hard segment." For elastic fiber applications the suitable components making up the "hard segment" are those which form in an independent reaction a polyester with a melting point above 200° C. when its molecular weight is high enough to be in the fiber-forming range (above about 10,000). Thus, as indicated previously, the "hard segments" consist of at least one repeating unit of a polyester. In accordance with the foregoing discussion a repeating unit may be represented by the formula

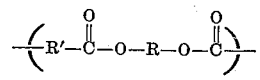

where R is the bivalent organic radical provided by the aromatic diol and R' is the bivalent organic radical provided by the diacid halide. The "soft segments" of the preferred elastomers have molecular weights between about 1000 and 3500. To produce polymers which are elastomers at room temperature, it is required that the "soft segments" comprise about 60–90% by weight of the polymeric product.

The polyester from which the "soft segment" in the elastomer is derived may contain a single type of linkage such as in the conventional polyesters, or it may have more than one type of linkage, as in the polyesters chain-extended with diisocyanates. In the latter case, ester and occasionally urethane linkages occur in the polymer chain. Even where the linkages are the same, the compositions may be a copolymer such as a copolyester. Copolymer formation is a useful method for modifying the properties of the polyester "soft segment," such as for reducing the melting point to a useful level. The polyester may be substituted with halogen, alkyl, and similar groups which do not interfere with the subsequent polymerization under the conditions used. In the practice of the invention, the proper reactants are chosen to produce a low molecular weight polymer with hydroxyl end-groups and with the required low melting point. Compounds with the desired combination of molecular weight and low melting point are usually obtained by interrupting the structure frequently with side chains or by introducing atoms other than carbon atoms into the main polymer chain.

The low molecular weight hydroxyl-terminated polyesters used in the practice of this invention can be prepared by reacting acids, esters, or acid halides with a molar excess of glycols. Primary or secondary glycols may be used. Suitable glycols are the polymethylene glycols, e.g., ethylene, propylene, butylene, decamethylene, substituted polymethylene glycols such as 2,2-diethyl-1,3-propanediol, cycloaliphatic glycols such as cyclohexanediol, and secondary glycols such as 2,5-hexanediol. In direct esterification of a dibasic acid with the glycol, the glycol is preferably used in about 20% molar excess, and air should be excluded from the reaction mixture. By reaction of glycols with the proper molar ratio of aliphatic, cycloaliphatic, or aromatic acids or their ester-forming derivatives, low molecular weight polyesters terminated essentially with hydroxyl groups are produced, although the presence of a few carboxyl end groups is not detrimental. Suitable acids for preparing polyesters and/or copolyesters are succinic, glutaric, adipic, suberic, sebacic, isophthalic, and hexahydroisophthalic acid. The alkyl- and halogen-substituted derivatives of these acids may also be used. In any case, a polyester is chosen such that it melts below 50° C.

As indicated above, the elastic properties attained by this invention result in part from the novel combination of a segment of a "hard" or high-melting polyester with a "soft" or low-melting polyester. The polyesters from which the former segments are derived all melt above 200° C. as for example, the polyester from diphenylolpropane and hexahydroterephthalic acid, which melts at 300° C. In other words, any combination of aliphatic, aromatic, or cycloaliphatic diacid chloride and aromatic diol may be used for reaction with the hydroxyl-terminated polyester "soft segments," providing that the diacid chloride and aromatic diol are such that in an independent reaction they form a polyester having a melting point above 200° C. Within this limitation, any aromatic diol is suitable for the preparation of elastic copolyesters according to this invention. Glycols, that is, diols in which the hydroxyl groups are not attached to aromatic ring systems, are not suitable for forming "hard segments" in the practice of this invention. Preferably, the suitable aromatic diols are the dihydroxy aromatic hydro-carbons of 6-16 carbon atoms, in which the shortest chain of carbon atoms connecting the two hydroxy radicals includes at least 3 carbon atoms of one ring. These include the following diols: hydroquinone, resorcinol, p,p'-diphenylolmethane, p,p'-diphenylolpropane, p,p'-dihydroxybiphenyl, 3,3'-dihydroxybiphenyl, 2,6-dihydroxytoluene, 4,4'-dihydroxybibenzyl, 4,4'-dihydroxy-2,2'-dimethylbiphenyl, 1,5-dihydroxynapthalene, 2,6-dihydroxynaphthalene, and 1,4-dihydroxynaphthalene. Other diols which may be used include 4,4'-dihydroxydiphenyl ether, 3,3'-dihydroxydiphenyl sulfone, and 4,4'-dihydroxydiphenyl sulfone.

The symmetrical aromatic diols constitute a preferred group in that they lead to higher melting polyesters than do unsymmetrical diols. These include the following para-oriented aromatic diols: hydroquinone, p,p'-diphenylolpropane, p,p'-dihydroxybiphenyl, and tetrachlorohydroquinone. A "hard segment" containing a unit of a high-melting polyester (melting preferably above 250° C.) provides an excellent "tie point" for joining the low-melting, amorphous "soft segments," so that a copolyester is produced having good elastic properties.

Within the melting point limitation set forth above, any aliphatic, cycloaliphatic, or aromatic diacid chloride is suitable for the practice of this invention. Suitable acids whose acid chlorides may be used in the formation of "hard segments" are, for example, 4 to 10 carbon acids such as, succinic, adipic, sebacic, hexahydroterephthalic, isophthalic, and terephthalic acids. The alkyl- and halogen-substituted derivatives of these acids may also be used. As with the aromatic diols, symmetrically substituted diacid chlorides are preferred. Acid chlorides of aliphatic and cycloaliphatic acids are preferred, since generally they lead to segmented polymers having a higher degree of solubility in spinning solvents. Inasmuch as melt spinning of the segmented copolyesters is accompanied by ester interchange which destroys the segmentation of the polymers, the property of solubility is extremely important in respect to shaping of the polymers from solution.

As indicated above, the polyesters, making up the "soft segments" or the "hard segments" or both, may be homopolymers or copolymers. The essential features for the "soft segments" are that they be difunctional and have a melting point below 50° C. Copolymers usually melt lower and show less tendency toward crystallization in the final segmented polymer. For this reason, it is preferable that the use of copolymers be restricted to the "soft segments" of the final segmented polymer so that the "hard segments" may have as high a melting point as possible. Polymers used in accordance with this invention are similar in filament-forming and elastic properties, while polymers prepared outside the molecular weight limitations of the invention will differ in such properties.

Elastic films and fibers prepared from the polymers of this invention display outstanding color stability, light durability, and oxidative stability. By color stability is meant the resistance to discoloration from ultraviolet light. By light durability is meant retention of mechanical properties (tenacity, stress decay, tensile recovery, etc.) on exposure to ultraviolet light. Oxidative stability refers to the retention of mechanical properties on exposure to air at high temperatures. The elastic filaments of this invention are greatly superior in color stability and light durability to filaments prepared from linear segmented polyester-ureas, polyester-urethanes, and polyester-ureylenes. Accordingly, when resistance to degradation by sunlight or ultraviolet radiation is important, the use of an all-ester segmented elastomer has a great advantage over the use of other types of segments with polyesters. Furthermore, the use of an all-ester segmented elastomer has the advantage over a polyether-ester (having polyether "soft segments") in that the copolyesters have a greatly improved oxidative stability as compared to the polyether-esters. In this respect, the oxidative stability of the copolyesters is more than twenty times as great as that of the polyether-esters.

Solution polymerization is generally preferred in preparing the segmented copolyesters of this invention. This involves dissolving the reactants in a common solvent which is inert to the reactants, e.g., chlorobenzene and o-dichlorobenzene, and heating the mixture to effect condensation between the reactants in order to form the polymers of this invention. It is preferable to carry out the polymerization reaction under conditions whereby the by-product hydrogen chloride is rapidly removed from the heated reaction mixture by a stream of inert gas. The molecular weight of the polymers is controlled by the choice of the solvent medium and/or by the relative quantity of reagents used.

When the polymerization reaction has been carried out in a solvent in which the reaction product remains soluble, films or coatings may be formed by pouring or otherwise applying a solution to form a thin film and allowing the solvent to evaporate.

For optimum results, the copolyesters of this invention should have an inherent viscosity of the order of 1.0–3.0 or above, although copolyesters having inherent viscosities as low as 0.5 are useful. Polymers in the lower molecular weight range are useful in certain applications, such as the preparation of molded objects. However, the ones of particular interest are those with molecular weights in the fiber-forming range, i.e., above about 10,000. Inherent viscosity is defined as:

$$\frac{\ln \eta_r}{C}$$

in which $\eta_r$ is the viscosity of a dilute solution of the polymer divided by the viscosity of the solvent in the same units and at the same temperature, and C is the concentration in grams of the polymer per hundred ml. of solution. Inherent viscosities recorded herein were measured in tetrachloroethane/phenol (40/60) at 25° C. In most cases a concentration of 0.5 gram per hundred ml. of solution was used.

An outstanding feature of this invention is that it is possible to prepare solutions of many of the segmented copolyesters, and such solutions can be used directly in the preparation of filaments, bristles, and similar articles. Filaments are prepared preferably by dry spinning. In shaping filaments using solutions, chlorinated hydrocarbons such as chlorobenzene and o-dichlorobenzene have been found satisfactory for preparing solutions of suitable concentration.

Conventional conditions are used for dry spinning except that the elastic filaments usually have to be talced or lubricated, usually with water, because they tend to be somewhat tacky immediately after extrusion. Spinning speeds are usually lower than those used in some commercial dry spinning processes for textile filaments, although speeds in excess of 300 yards per minute have been attained with elastic filaments, which represents excellent productivity for filaments of this type.

A drawing operation is usually not necessary to develop desirable properties, particularly satisfactory elastic properties, in the filaments of this invention. However, the overall properties of the filaments are frequently improved by a drawing operation, which results in increased orientation and crystallinity in the final structure. Therefore, prior to final packaging, the yarns may be drawn at a suitable draw ratio such as 2 to 10× for the particular elastomer, and relaxed, to give a product with a desired combination of tenacity, initial modulus, yarn elongation, elasticity, and similar properties. It is possible to dry spin filaments having deniers as low as 1 or 2 from the polymers of this invention.

The filaments of this invention have properties which make them useful in such applications as fabrics, rope, paper, and felt, among others. The elastic filaments of this invention are useful as binders for papers and laminates. The higher tenacities, high initial modulus, superior abrasion resistance, and more easily controlled elongation of the filaments of this invention fit them for many applications for which rubber filaments are undesirable. Most of these filaments possess the additional advantage that they are easily fabricated.

In the following examples, parts given are by weight, except where otherwise noted. "Tenacity" is a measure of the tensile strength of fibers expressed in grams per denier (g.p.d.). "Elongation" is the percent elongation of the fiber at the breaking point. "Initial modulus" is determined by measuring the initial slope of the stress-strain curve. The examples are given by way of illustration and it is to be understood substitutions of equivalent reactants falling within the above disclosure may be made with comparable results.

*Example I*

A mixture of 2.4 moles of 2,2-diethyl-1,3-propanediol and 2.0 moles of sebacic acid is heated with stirring under nitrogen for 16 hours at 180° C. at atmospheric pressure, and then for 24 hours at 200° C. at less than 1 mm. mercury pressure. Poly(2,2-diethyltrimethylene sebacate) is obtained as a viscous liquid having by analysis 598 OH groups and 6 carboxyl groups per million grams of polymer, indicating a molecular weight of approximately 3300.

A mixture of 16.5 grams of the above-described hydroxyl-terminated polyester (0.005 mole), 3.77 grams of hexahydroterephthaloyl chloride (0.018 mole), and 2.91 grams of p,p'-diphenylolpropane (0.013 mole) is reacted in 100 ml. of chlorobenzene for 24 hours at 133° C. The reaction is carried out under nitrogen whereby a stream of nitrogen removes the hydrogen chloride evolved in the reaction. There is obtained a chlorobenzene solution of a segmented copolyester having an inherent viscosity of 1.5 and containing approximately 80% of poly(2,2-diethyltrimethylene sebacate) segments.

The solution is dry spun in the usual manner yielding elastic fibers having the following properties: tenacity 0.40 g.p.d., elongation 720%, initial modulus 0.08 g.p.d., stress decay 8%, and tensile recovery 92%. After 100 hours of exposure to ultraviolet light in a Fade-Ometer, the tenacity of the fibers is substantially unchanged. Likewise, after exposure to air at 100° C. for 100 hours, the tenacity of the fibers is substantially unchanged.

*Example II*

A hydroxyl-terminated polyester having a molecular weight about 1520 is prepared from 1,4-butanediol and 3,3-dimethylglutaric acid by the method described in Example I. A mixture of 0.005 mole of the above-described polyester, 0.018 mole of hexahydroterephthaloyl chloride, and 0.013 mole of p,p'-diphenylolpropane is heated under nitrogen in 100 ml. of chlorobenzene for 24 hours at 133° C. The solution is dry-spun in the usual manner to yield elastic fibers having the following properties: tenacity 0.35 g.p.d., elongation 700%, initial modulus 0.06 g.p.d., stress decay 8%, and tensile recovery 90%.

*Example III*

A mixture of 16.5 grams of the hydroxyl-terminated polyester described in Example I (0.005 mole), 4.26 grams of succinyl chloride (0.0275 mole), and 2.48 grams of hydroquinone (0.023 mole) is heated under nitrogen in 100 ml. of o-dichlorobenzene for 12 hours at 179° C. There is obtained a solution of a segmented copolyester having an inherent viscosity of 1.35 and containing approximately 80% of poly(2,2-diethyltrimethylene sebacate) segments. Elastic films having the following properties are obtained from the solution: tenacity 0.17 g.p.d., elongation 660%, initial modulus 0.05 g.p.d., stress decay 7%, and tensile recovery 93%.

*Example IV*

Poly(2,2-diethyltrimethylene sebacate) is prepared as in Example I above except that the final heating period is for 18 hours at 200° C. at less than 1 mm. pressure. The polyester is obtained as a viscous liquid having by analysis 763 OH groups and 6 carboxyl groups per million grams of polymer, indicating a molecular weight of approximately 2600.

A mixture of 13.0 grams of the above-described hydroxyl-terminated polyester (0.005 mole), 3.82 grams of sebacyl chloride (0.016 mole), and 2.68 grams of tetrachlorohydroquinone (0.011 mole) in 100 ml. of o-dichlorobenzene is heated under nitrogen at 179° C. for 12 hours. There is obtained a segmented copolyester containing approximately 75% of poly(2,2-diethyltrimethylene sebacate) segments and having an inherent viscosity of 1.35. By casting the solution there is obtained a film having good elasticity and showing no apparent change when exposed for 100 hours at 100° C. to air or exposed for 100 hours to the ultraviolet light of a Fade-Ometer.

*Example V*

A mixture of 13.0 grams of the hydroxyl-terminated polyester described in Example IV (0.005 mole), 8.36 grams of hexahydroterephthaloyl chloride (0.04 mole), and 7.85 grams of hydroquinone (0.035 mole) is heated under nitrogen in 100 ml. of o-dichlorobenzene for 12 hours at 179° C. There is obtained a solution of a segmented copolyester having an inherent viscosity of 1.43 and containing approximately 60% of poly(2,2-diethyl-trimethylene sebacate) segments. There are obtained from the solution elastic films having outstanding resistance to degradation by ultraviolet light in a Fade-Ometer or by air at 100° C.

Example VI

A mixture of 16.5 grams of the hydroxyl-terminated polyester described in Example I (0.005 mole), 5.65 grams of hexahydroterephthaloyl chloride (0.027 mole), and 4.93 grams p,p'-diphenylolpropane (0.022 mole) is reacted in 100 ml. of chlorobenzene for 24 hours at 133° C. under nitrogen. There is obtained a solution of a segmented copolyester having an inherent viscosity of about 1.4 and containing approximately 70% of poly-(2,2-diethyltrimethylene sebacate) segments. The solution is dry spun in the usual manner yielding elastic fibers having the following properties: tenacity 0.20 g.p.d., elongation 650%, initial modulus 0.12 g.p.d., stress decay 15%, and tensile recovery 90%. After 100 hours of exposure to ultraviolet light or 100 hours of exposure to air at 100° C. as described in Example I, the tenacity of the fibers is substantially unchanged.

The elastic fibers of this invention possess a number of advantageous properties including an outstanding oxidative stability and color stability, excellent resistance to mechanical abrasion, and to deterioration caused by stretching, flexing and the like. This combination of properties suggests the use of these polymers as uncovered filaments in elastic fabrics and garments. Obviously, these filaments and fibers can also be useful in fabrics and garments when they are covered, as rubber is for such applications. The elastic yarns of this invention are characterized by higher strength and stretch modulus than any rubber threads known. Stretch modulus measures the force required to elongate the yarn a given percentage. A garment made of yarns having high tenacity and high stretch modulus will not only be durable but will also exert substantial pressure on the body of the wearer after the garment is stretched into position as desired, for example, in surgical stockings.

The outstanding oxidative stability and ultraviolet color stability which the polymers of this invention display permit the taking of full advantage of the unique properties of a fine denier, elastic thread in uncovered yarn end uses. Of even greater importance is the use of these elastomers in staple blends with other fibers. In such blends, the elastomers of this invention may be used, for example, to up-grade fibers of lower quality, e.g., viscose, acetate, etc., or to prepare a more resilient yarn for carpet and rug applications.

The elastic properties of these materials may be varied by suitable compounds. The amount and type of compounding agent to be incorporated is dependent on the use for which the elastomer is intended. The compounding agents ordinarily used in the rubber industry are useful for this invention. These include carbon black, clay, silica, pigments, and plasticizers. Inorganic and organic coloring agents may be incorporated to give a well-defined color. Conventional agents for stabilizing elastomeric compositions to heat or ultraviolet radiation may also be incorporated, but such stabilizers are rarely needed.

It will be apparent that many widely different embodiments of this invention may be made without departing from the spirit and scope thereof, and therefore it is not intended to be limited except as indicated in the appended claims.

I claim:

1. A substantially linear segmented copolyester consisting essentially of segments of two classes interconnected in the polymer chain by ester linkages, the segments of the first class being polyester segments which are the residues remaining after removal of the terminal hydroxyl groups from a hydroxyl-terminated polyester having ester linkages in the polymer chain, a melting point below about 50° C. and a molecular weight between about 600 and about 5000, said segments of the first class being connected by ester linkages of the formula

to segments of the second class which consist essentially of polyester segments containing at least one repeating unit of a linear polyester having a melting point above about 200° C. in its fiber-forming molecular weight range, said repeating unit being of the formula

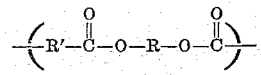

wherein R is the bivalent organic radical remaining after removal of the hydroxyl groups from an aromatic diol having the hydroxyl groups attached directly to an aromatic ring and R' is a bivalent organic radical selected from the group consisting of aliphatic, cycloaliphatic, and aromatic radicals, said segments of the first class providing from about 60% to about 90% by weight of said segmented copolyester.

2. The segmented copolyester of claim 1 in which the molecular weight of the first said segment is between about 800 and 5000.

3. The segmented copolyester of claim 1 in which the the second segment is provided by the reaction product of diphenylolpropane and hexahydroterephthalic acid.

4. The segmented copolyester of claim 1 in which the diol is a symmetrical aromatic diol.

5. The segmented copolyester of claim 4 in which the diol is a hydroquinone.

6. The segmented copolyester of claim 1 wherein the said radical R' is the bivalent organic radical remaining after removal of the

groups from the diacid chloride of a dicarboxylic acid.

7. A shaped article of the segmented copolyester of claim 1 having one dimension substantially greater than at least one other dimension.

8. The shaped article of claim 7 in the form of a filament.

9. The shaped article of claim 7 in the form of a film.

10. The filament of claim 8 which has a tensile recovery of at least 90% and a stress decay of less than 20%.

11. A filament of claim 8 having a denier of less than 50.

12. A filament of claim 11 having a denier between about 5 and 10.

13. The segmented copolyester of claim 1 in which the polyester of the second segment melts above 250° C.

14. A substantially linear segmented copolyester consisting essentially of segments of two classes interconnected in the polymer chain by ester linkages, the segments of the first class being polyester segments which are the residues remaining after removal of the terminal hydroxyl groups from a hydroxyl-terminated polyester having ester linkages in the polymer chain, a melting point below about 50° C. and a molecular weight between about 600 and about 5000, said segments of the first class being connected by ester linkages of the formula

to segments of the second class which consist essentially of polyester segments containing at least one repeating unit of a linear polyester having a melting point above about 200° C. in its fiber-forming molecular weight range, said repeating unit being of the formula

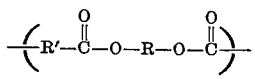

wherein R is the bivalent organic radical remaining after removal of the hydroxyl groups from an aromatic diol having the hydroxyl groups attached directly to an aromatic ring and R' is the bivalent organic radical remaining after removal of the

groups from the diacid chloride of a dicarboxylic acid having from about 4 to 10 carbon atoms.

15. A filament made from the product of claim 14.

References Cited in the file of this patent
UNITED STATES PATENTS 2,496,933    Caldwell _____ Feb. 7, 1950
2,691,006    Flory _____ Oct. 5, 1954

OTHER REFERENCES

Bjorksten et al.: "Polyesters and Their Applications," published 1956 by Reinhold Pub. Co., page 206.